United States Patent
Rasi

(10) Patent No.: US 10,496,629 B2
(45) Date of Patent: Dec. 3, 2019

(54) DYNAMIC STATE TRACKING WITH QUERY SERVING IN AN ONLINE CONTENT PLATFORM

(71) Applicant: COURSERA INC., Mountain View, CA (US)

(72) Inventor: Marc Rasi, Sunnyvale, CA (US)

(73) Assignee: COURSERA, INC., Mountain View, CA (US)

( * ) Notice: Subject to any disclaimer, the term of this patent is extended or adjusted under 35 U.S.C. 154(b) by 260 days.

(21) Appl. No.: 15/703,432

(22) Filed: Sep. 13, 2017

(65) Prior Publication Data

US 2019/0079964 A1    Mar. 14, 2019

(51) Int. Cl.
  *G06F 16/23* (2019.01)
  *G09B 5/12* (2006.01)
  *G06F 16/22* (2019.01)
  *G09B 7/00* (2006.01)
  *G09B 5/06* (2006.01)

(52) U.S. Cl.
  CPC .............. *G06F 16/23* (2019.01); *G06F 16/22* (2019.01); *G06F 16/2365* (2019.01); *G09B 5/06* (2013.01); *G09B 5/12* (2013.01); *G09B 7/00* (2013.01)

(58) Field of Classification Search
  CPC .................................................. G06F 16/2365
  See application file for complete search history.

(56) References Cited

U.S. PATENT DOCUMENTS

| | | | | |
|---|---|---|---|---|
| 4,037,332 A | * | 7/1977 | Petrusinsky | G09B 7/00 434/307 R |
| 2005/0216573 A1 | * | 9/2005 | Gutjahr | H04L 41/044 709/219 |
| 2009/0178021 A1 | * | 7/2009 | Alluri | G06F 11/3684 717/104 |
| 2011/0039249 A1 | * | 2/2011 | Packard | G09B 5/00 434/362 |
| 2011/0171621 A1 | * | 7/2011 | Sims | G09B 5/00 434/322 |
| 2013/0330704 A1 | * | 12/2013 | Creamer | G09B 7/00 434/362 |
| 2017/0372442 A1 | * | 12/2017 | Mejias | G06F 19/32 |

* cited by examiner

*Primary Examiner* — William Spieler
(74) *Attorney, Agent, or Firm* — Brake Hughes Bellermann LLP

(57) ABSTRACT

Techniques described herein provide a service and associated interface that are capable of serving online queries for learners' states with respect to various types of learning content. For example, the described techniques may serve a query to determine items that have been completed by a particular user, or courses with which a user has recently interacted. More particularly, the described techniques provide a uniform interface for all such learner progress, which facilitates fast and efficient capabilities of users, administrators, and developers with respect to finding, using, and modifying learner progress.

20 Claims, 14 Drawing Sheets

DYNAMIC STATE TRACKING WITH QUERY SERVING IN AN ONLINE CONTENT PLATFORM

TECHNICAL FIELD

This description relates to techniques for tracking state data and executing database updates in a manner that facilitates querying of the state data.

BACKGROUND

Online learning platforms provide network-based educational opportunities for users, which would otherwise be inconvenient or unavailable for those users. However, developing the software for such online learning platforms, and otherwise enabling network-based use and administration of such online learning platforms, is technically challenging.

For example, in typical online learning scenarios, thousands or millions of users may access the online learning platform, and thereby progress over time through many different courses of instruction. In other words, a current state of each such user with respect to the user's coursework will typically change over time, with varying rates of change. Moreover, some users may be enrolled in multiple courses at once, where the multiple courses may or may not be related to one another for a given user. For example, a particular user might take a group of courses as part of a larger concentration or group of courses, while other users may simply take individual ones of the same courses.

Further, online learning platforms, by definition, are built and intended for use by large numbers of users. As all of the users are progressing through the various courses at different rates and different times, it is difficult to quickly determine a current state of each user and/or for each course. For example, it may require an undesirably long time to calculate a current state of a user. In other cases, it may be technically challenging to quickly and accurately obtain desired state information, such as when various courses utilize a plurality of different interfaces and calculation techniques for determining state information. In more specific examples, it may occur that users' grades (and rules for combining grades) are spread across different systems, possible in slow-to-access forms. In such cases, it may be necessary to wait for unacceptably long times to retrieve the data needed to calculate a state that is dependent on multiple grades. For these and other reasons, it may difficult or impossible for users and administrators to determine desired state information in a fast and efficient manner.

SUMMARY

Accordingly, techniques described herein provide a service and associated interface that are capable of serving online queries for learners' states with respect to various types of learning content. For example, the described techniques may serve a query to determine items that have been completed by a particular user, or courses with which a user has recently interacted. More particularly, the described techniques provide a uniform interface for all such learner progress, which facilitates fast and efficient capabilities of users, administrators, and developers with respect to finding, using, and modifying learner progress. Moreover, the various features of the techniques described herein generalize across many different types of learner progress. Individual user progress may be indexed with respect to each user, so that for this and other reasons as described herein, state information for each user may be determined extremely quickly. Further, individual content items may be shared between various different courses, and updates to the content, or other aspects of the various courses, may be quickly and easily accommodated with respect to the state data already previously stored. Further, the techniques described herein enable straightforward extraction of course data for use, e.g., in the context of an analytics database.

According to an example implementation, a computer program product may be tangibly embodied on a non-transitory computer-readable storage medium and may include instructions that, when executed, are configured to cause at least one computing device to receive a content item of a content hierarchy of content items, the received content item associated with a content type of coursework of an online learning content platform, wherein each of the content items is associated with a state per user characterizing a current effect of interactions of the user with the coursework, including a corresponding state for the received content item. When executed, the instructions may be further configured to cause the at least one computing device to access, from a state update rules database, a state update rule governing state updates for the content type, determine, from the state update rule, a child state upon which the corresponding state depends, and insert, into a state database, a state relationship entry characterizing the relationship between the child state and the corresponding state, wherein the state database thereby includes a state relationship hierarchy corresponding to the content hierarchy and defined by state relationship entries characterizing dependencies between the states, including the state relationship entry. When executed, the instructions may be further configured to cause the at least one computing device to receive an interaction event message characterizing a content interaction of the user with a selected content item of the content items, calculate, based on the state relationship hierarchy and the interaction event message, all affected states of the content interaction, update the affected states using corresponding state update rules of the state update rules database; and store the updated states in the state database.

According to an example implementation, a computer program product may be tangibly embodied on a non-transitory computer-readable storage medium and include instructions that, when executed, are configured to cause at least one computing device to determine a content hierarchy of content items associated with coursework of an online learning content platform, each content item being associated with a state per user characterizing a current effect of interactions of the user with the coursework. When executed, the instructions may be further configured to cause the at least one computing device to determine, from a state database, a state relationship hierarchy defined by state update rules for each state of each content item, store a queue of interaction event messages characterizing content interactions of a plurality of users, including the user, with the coursework, wherein the queue is partitioned by user, and execute a state update algorithm operating on messages from the queue to update all states of the state relationship hierarchy that are changed by each queued message, and to store the updated states within the state database. The state update algorithm may include traversing, for a current interaction event message, the state relationship hierarchy to find all states directly and indirectly affected by the interaction event message, executing a state update for each state associated with an event-based state update rule, using event data associated with the interaction event message, and executing a state update for each state associated with a state-based state update rule, based on any already-executed state updates for one or more underlying states within the state relationship hierarchy.

The above-referenced example implementations may also be implemented as corresponding, methods, systems, or devices. Further, the details of these and other implementations are set forth in the accompanying drawings and the description below. Other features will be apparent from the description and drawings, and from the claims.

DETAILED DESCRIPTION

Figure 1:
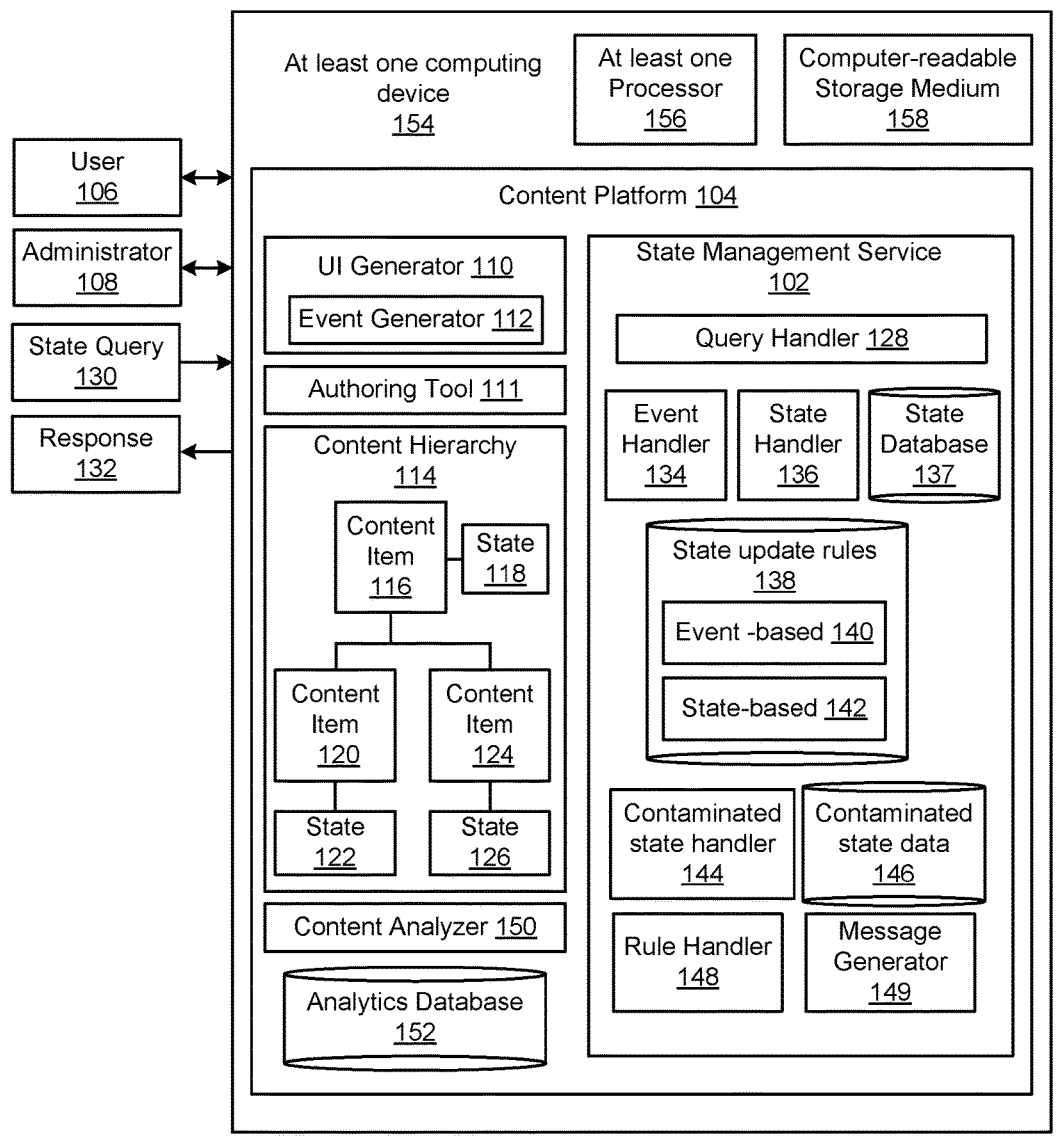
FIG. 1 is a block diagram of a system for dynamic state tracking with query serving.

FIG. 1 is a block diagram of a system 100 for dynamic state tracking with query serving. In the example of FIG. 1, a state management service 102 of a content platform 104 provides the type of interface referenced above and described in detail below, so that, e.g., a user 106 and/or an administrator 108 may quickly and easily access desired state information.

In the example of FIG. 1, a UI generator 110 is configured to provide one or more graphical user interfaces to the user 106 and/or the administrator 108. For example, such graphical user interfaces may be used to provide learning content, including providing the user 106 with, e.g., lecture videos, written content, and other instructive material, as well as interactive aspects for administering tests, receiving submitted/completed assignments, and otherwise serving online learning content to the user 106. The UI generator 110 may further be configured to provide one or more suitable graphical user interfaces to the administrator 108, so that the administrator 108 may, for example, monitor various aspects of the progress of the user 106, or create or update content within the content platform 104.

In the latter respect, an authoring tool 111 may be utilized by the administrator 108, or other course developer, to provide new or updated content. For example, the administrator 108 may represent a system administrator responsible for maintaining various aspects of the network administration of the content platform 104 that are not necessarily related to a specific course of instruction, such as the authentication of the user 106 for access to the content platform 104. In other examples, the administrator 108 may represent a teacher or other instructor provided with an ability to create and upload various types of course-specific content to be used in administering associated courses to the user 106.

As referenced above, it will be appreciated that the user 106 represents a potentially large number of users accessing the content platform 104, including a correspondingly large type and number of available courses. As the various users 106, as well as the various administrators represented by the administrator 108, interact with a content platform 104 via the UI generator 110, an event generator 112 is triggered to respond to the various interaction events. For example, such interaction events may occur, at least in part, as part of a normal process flow of a specific course of instruction. For example, completion of an assignment by the user 106 may trigger an event that is configured by the authoring tool 111 to further trigger, e.g., a grading process, or the sending of a subsequent assignment. It will be appreciated that these and similar techniques for administering online courses, as such, are not described here in detail, except as may be necessary or helpful in understanding the techniques described herein for serving queries related to the dynamically updating states of the various users 106 as each user advances through his or her courses of instruction.

In particular, a content hierarchy 114 illustrates that each course, or group of courses, may be organized in a hierarchical fashion. As illustrated, a content item 116 may be associated with a corresponding state 118, and may be connected as a parent to a child content item 120, associated with a state 122, as well as to a child content item 124, itself associated with the state 126. Simplified examples of the content hierarchy 114 are illustrated and described below, e.g., with respect to FIGS. 3, 6, and 7. In general, however, it will be appreciated that the content items 116, 120, 124 may be associated with virtually any type of content that may be suitably included in a corresponding course of instruction. For example, such content items may include instructional videos, texts, assignments, tests, or quizzes. Accordingly, the various states 118, 122, 126 will be understood to correspond to the types of states associated with each corresponding content item 116, 120, 124. For example, a content item representing a video may have a state of either "not watched," or "watched."

In operation, as referenced above and described in detail below, the state management service 102 is configured, in conjunction with current progressions of the user 106 through content of one or more courses of instruction, to dynamically update and maintain accurate state data for the states 118, 122, 126. In other words, the state management service 102 maintains the states 118, 122, 126 in a queryable condition, in which each of the states 118, 122, 126, or combinations or derivations thereof, may be easily and quickly read and provided in a desired manner.

More particularly, as shown, a query handler 128 may be configured to receive a state query 130, and returning a corresponding response 132. As just referenced, upon receipt of the state query 130, the query handler 128 may be enabled to retrieve the requested state information, which has already been at least partially computed, updated, and/or otherwise maintained, even before the specific state query 130 was received. Accordingly, the user 106, the administrator 108, or any submitter of the state query 130 may quickly receive an accurate response 132 with respect to desired state information.

For example, the state query 130 may request a state for a particular user at a particular node of the content hierarchy 114 (e.g., at a particular course corresponding to the content item 116). The state query 130 also may request to be updated regarding state changes on a designated topic, such as sending a notification upon a completion of a course, or a specialization. In other examples, the state query 130 may request all the states for a user (e.g., all of the user's grades in all user-specific courses), or all the states for a content item (e.g., all the grades for all the users who have attempted a particular quiz).

For example, in FIG. 1, the state management service 102 is illustrated as including an event handler 134. As may be appreciated, the event handler 134 may be configured to receive events generated by the event generator 112. For example, the event handler 134 may be implemented using a kafka queue, as described below with respect to the example implementations of FIGS. 10-14, or using any suitable stream-processing platform or technique.

A state handler 136 of the state management service 102 may be configured to receive events from the event handler 134, possibly in conjunction with other state-related data that may be required by the state handler 136, and may be configured to actively update a state database 137 in which the various states 118, 122, 126, and dependencies therebetween, are stored. More specifically, as described below, e.g., with respect to FIGS. 2 and 10, the state database 137 may be populated with the various parent and child dependencies that exist between the various states 118, 122, 126, to form a state relationship hierarchy. For example, as also described below, such state dependencies may be added or updated in conjunction with corresponding additions or updates to content of the content hierarchy 114.

Accordingly, the state handler 136 may utilize state update rules 138 to respond to events received from the event handler 134, and thereby update the state database 137. As shown in FIG. 1, and illustrated and described below in more detail, e.g., with respect to FIGS. 4 and 5, the state update rules 138 may include event-based state update rules 140, as well as state-based update rules 142.

More particularly, as illustrated below with respect to FIG. 4, event-based update rules 140 generally refer to state updates that occur in response to interaction events between the user 106 and a specific content item of the content hierarchy 114. For example, as illustrated and described below with respect to FIGS. 3, 6, and 7, an interaction event for a video content item may include a partial or complete viewing of the video.

Meanwhile, the state-based state update rules 142 refer generally to state changes that are determined in response to, or derived from, other state changes within the content hierarchy 114. For example, because of a hierarchical nature of the content hierarchy 114, the state 122 of the content item 120 may change in a manner that affects the state 118 of the content item 116. For example, as also illustrated below with respect to FIGS. 6 and 7, the watching of a video associated with the content item 120 may increase an overall completion percentage for a larger course of instruction, which may be reflected in a current percentage value of the state 118.

Further in the example of FIG. 1, the state management service 102 includes a contaminated state handler 144, configured to update and maintain a contaminated state database 146. As illustrated and described below in detail with respect to FIGS. 11-13, contaminated states generally refer to states that have been changed as a result of some interaction of the user 106 or the administrator 108, but that have not yet been updated completely within the state database 137. In such scenarios, it may not be possible for the state database 137 to be used to provide a complete and accurate response 132 by the query handler 128, if the state query 130 is received prior to completion of, e.g., a queued state update that has not yet been implemented within the state database 137.

Accordingly, the contaminated state data 146 represents temporarily-stored state data that enables a complete and accurate providing of the response 132, when the state query 130 is received at a time that the state database 137 has not been completely or fully updated with respect to the state data needed to provide the response 132. As such, and as described in detail below, the contaminated state handler 144 may be configured to delete the transient contaminated state data 146, such as upon completion of updating of corresponding portions of the state database 137.

In FIG. 1, a rule handler 148 corresponds conceptually to the authoring tool 111, but with respect to authoring and updating of the state update rules 138. In other words, for example, the rule handler 128 may be utilized by the administrator 108 to define or select available events, and states changes therebetween with respect to corresponding content items, for use within the event-based state update rules 140. Similarly, the rule handler 148 may be configured to define whether and how one state, and/or changes thereto, will impact one or more other states within the content hierarchy 114.

As referenced above, the state handler 136 utilizes the state update rules 138 to make current or real-time updates to the states of the state database 137, in response to events received that the event handler 134, and in conjunction with use of the contaminated state data 146. In other words, states within the state database 137 are maintained in a queryable condition, e.g., pre-calculated, predetermined, or otherwise ready to be read upon receipt of the state query 130. If the authoring tool 111 or the rule handler 148 is used to update content of the content hierarchy 114, or rules of the state update rules 138, then such updates may have a retroactive impact on already-calculated states of the state database 137. Examples of corresponding operations of the state handler 136 in updating the state database 137 to reflect such content/rule changes are described below, e.g., with respect to FIG. 14.

Finally with respect to the state management service 102 of FIG. 1, a loader 149 may be configured to access the state database 137, and to extract, transform, and load analytics data into an analytics database 152. Accordingly, a content analyzer 150 may be configured to utilize analytics data within the analytics database 152, and thereby provide the administrator 108 with an ability to, e.g., make a global analysis of users, courses, teachers, or other aspects of the content platform 104.

For example, such analytics may include analysis of which teachers have an abnormally large dropout rate from their respective courses, types or characteristics of users who perform particularly well or particularly poorly in specific courses, or types of content that are determined to be particularly effective in facilitating users' success within the course. As may be appreciated from the present description, the manner in which the state data is stored within the state database 137 facilitates fast and straightforward extraction of the state data for use within the analytics database 152, thereby facilitating improved operations of the content analyzer 150.

Finally with respect to FIG. 1, the state management service 102 is illustrated as being executed using at least one computing device 154, which itself includes at least one processor 156 and a non-transitory computer readable storage medium 158. For example, the at least one computing device 154 may represent one or more computing devices configured to implement the state management service 102 by causing the at least one processor 156 to access corresponding instruction stored using the non-transitory computer readable storage median 158.

Of course, as is apparent, the at least one computing device 154 is intended as a highly simplified representation of the types of computing devices that may be utilized to provide the state management service 102, and therefore does not explicitly illustrate various known hardware/software components that may be utilized in the various implementations of the system 100.

Further, although the state management service 102 is illustrated as including a number of separate, discrete components, it will be appreciated that any two or more components or sub-components may be combined for operation of the single component, while, conversely, a single component may have two or more of its functions implemented using two or more separate components.

In various embodiments, the system 100 may be implemented in an architecture in which the at least one computing device 154 represents one or more back-end devices (e.g., web server, application server, or database system) that are configured to store, maintain, and process data. As with most such back-end/front-end architectures, a manner and extent to which various features and functionalities are provided using the back-end, as opposed to the front-end, may be at least partially configurable.

Figure 2:
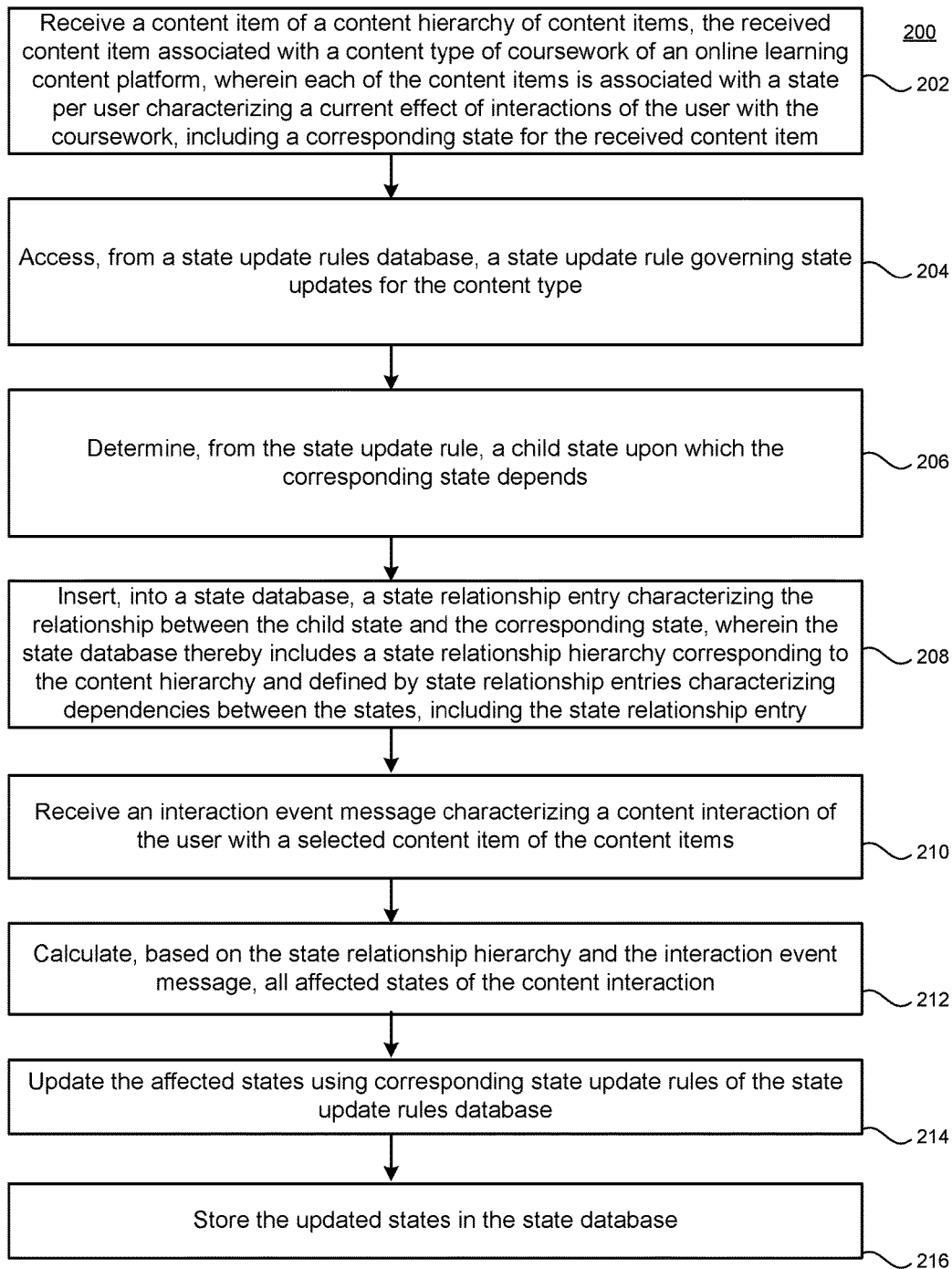
FIG. 2 is a flowchart illustrating example operations of the system of FIG. 1.

FIG. 2 is a flowchart 200 illustrating example operations of the system 100 of FIG. 1. In the example of FIG. 2, operations 202-216 are illustrated as separate, sequential operations. However, it will be appreciated that, in alternative embodiments, additional or alternative operations or sub-operations may be included, operations may be performed in a different order than that shown, and/or one or more operations or sub-operations may be omitted. Further, it may occur that any two or more operations or sub-operations may be executed in a partially or completely overlapping or parallel manner, or in a nested, iterative, looped, or branched fashion.

In the example of FIG. 2, a content item of a content hierarchy of content items may be received, the received content item associated with a content type of coursework of an online learning content platform, wherein each of the content items is associated with a state per user characterizing a current effect of interactions of the user with the coursework, including a corresponding state for the received content item (202). For example, the content item 120 of FIG. 1 may be received by the event handler 134 from the authoring tool 111, and may be of a content type of 'lecture video,' as described below with respect to FIGS. 3, 6, and 7. Of course, the content type may be of any type described herein, such as a lecture, a quiz, a test, an assignment, a document, or any type suitable for the content items of the content hierarchy in question. Consequently, the state of a given content item will include a state suitable for characterizing that type of content item, so that, for example, an assignment, course, or specialization content item may be "completed," "partially completed," or "not completed," or a document may be "read" or "not read." The content hierarchy, such as the content hierarchy 114 of FIG. 1, may refer to any suitable arrangement or relationship of content items of varying levels of granularity, as illustrated and described below, e.g., with respect to FIGS. 3, 6, and 7.

From a state update rules database, a state update rule governing state updates for the content type may be accessed (204). For example, the state handler 136 may access the state update rules 138 to determine an appropriate rule(s). That is, the state update rules 138 may store relationships between the various available content types, and corresponding state update rules. As referenced above, some states may be updated based on the occurrence of events, such as the watching of a video, or the submission of an assignment, or the taking of a test. Some states may be updated based on the updating or changing of other states within the hierarchy.

From the state update rule, a child state upon which the corresponding state depends may be determined (206), where the child state, as described herein, may represent at least one, or a plurality, of child states. For example, the state handler 136 may determine that the state 118 of the content item 116 depends on the states 122 and 126.

A state relationship entry may be inserted into a state database characterizing the relationship between the child state and the corresponding state, wherein the state database thereby includes a state relationship hierarchy corresponding to the content hierarchy and defined by state relationship entries characterizing dependencies between the states, including the state relationship entry (208). For example, the state handler 136 may be configured to store such a state relationship hierarchy between the states 118, 122, 126, within the state database 137.

An interaction event message characterizing a content interaction of the user with a selected content item of the content items may be received (210). For example, the event handler 134 may receive an event from the event generator 112, as described above with respect to FIG. 1. The event handler 134 may construct the interaction event message to include directly affected states, associated state update rules, and any supplemental event data that may be necessary to execute an event-based state update rule.

Based on the state relationship hierarchy and the interaction event message, all affected states of the content interaction may be calculated (212). For example, the state handler 136 may access the state database 137 and calculate all directly and indirectly affected states, including parent and grandparent states within the state relationship hierarchy.

The affected states may then be updated using corresponding state update rules of the state update rules database (214). For example, the state handler 136 may update the affected states, using the corresponding state update rules from the state update rules database 138.

The updated states may then be stored in the state database (216). For example, the updated states may be stored in the state database 137 by the state handler 136. In this way, as described herein, the updated states are available for fast, uniform, straightforward querying, e.g., by way of the query handler 128 receiving the state query 130 and returning a queried state within the response 132.

Figure 3:
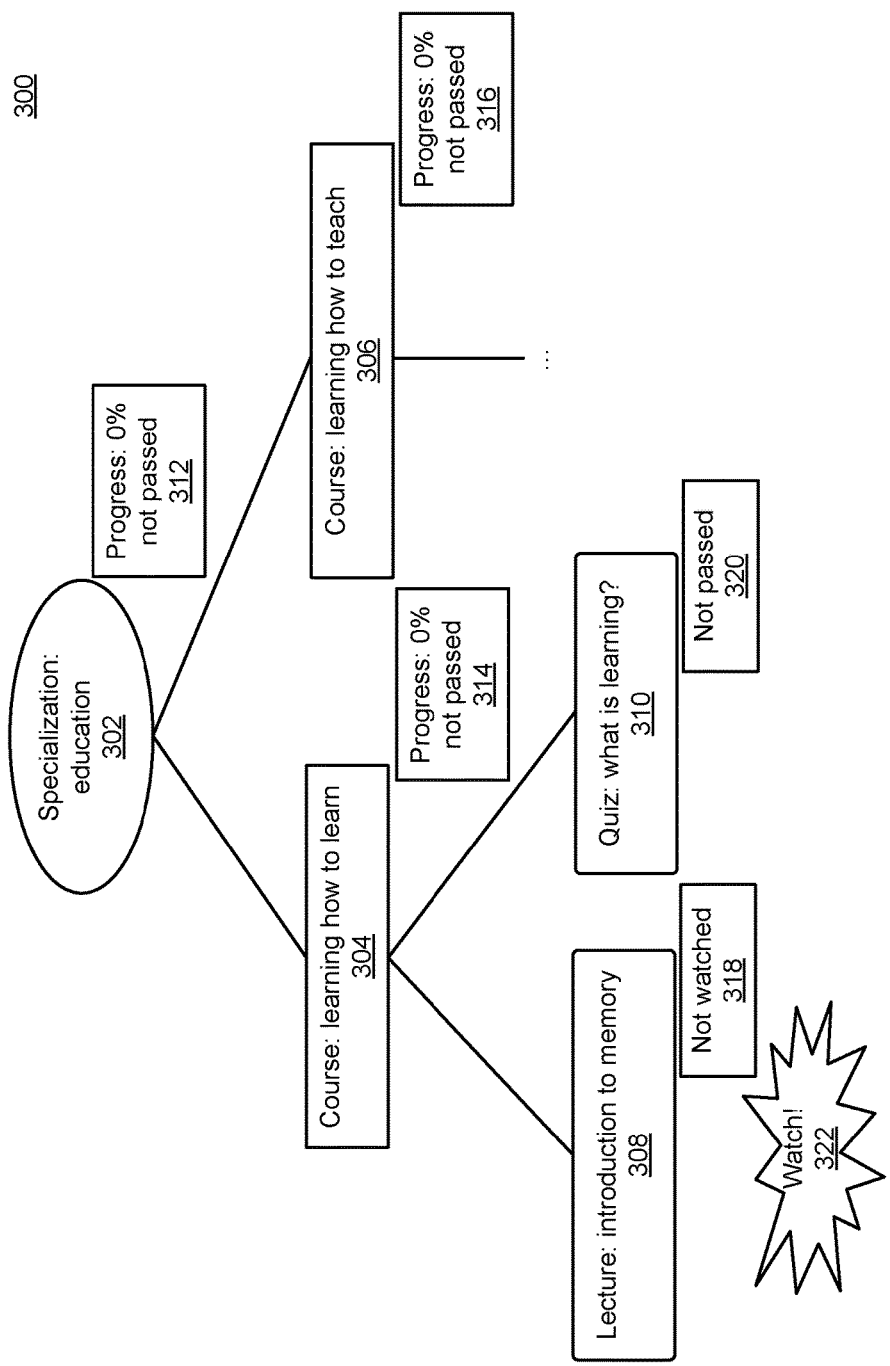
FIG. 3 is a block diagram of a content hierarchy used in the system of FIG. 1.

FIG. 3 is a block diagram of a content hierarchy 300 illustrating an example of the content hierarchy 114 of FIG. 1. In the example of FIG. 3, a content item is illustrated as a node 302 representing a specialization of education. That is, as shown, the specialization education includes two courses, illustrated as a node 304 representing a course for "Learning How to Learn," and a node 306 representing a course "Learning How to Teach." As also illustrated, each course node 304, 306 may itself be a parent node to one or more child nodes. For example, as shown, the course node 304 is a parent node to a lecture node 308 for a video lecture "Introduction to Memory." Meanwhile, a second child node 310 corresponds to a quiz on the topic "What is Learning?" Of course, the hierarchy 300 should be understood to represent a potentially small fraction of a larger content hierarchy, simplified in FIG. 3 for the sake of conciseness and explanation.

As also illustrated, each of the nodes 302-310 is associated with state data. For example, the node 302 is associated with state 312, illustrating a percentage of the specialization "education" that has been passed by a particular user. In other words, for example, the state 312 represents an aggregated or combined progress of the user with respect to the two course nodes 304, 306.

Similarly, each of the course nodes 304, 306 is associated with a corresponding, respective state 314, 316. As with the state 312, the state 314 corresponds to a state of progress of the particular user with respect to the course "Learning How to Learn" 304. As may be observed, similar comments apply to the state 316, representing the user's progress, in percentage terms, with respect to the course "Learning How to Teach" 306.

Further in FIG. 3, a state 318 corresponds to the node 308, while a state 320 corresponds to the node 310. Specifically, as shown, the node 308 corresponds to the video lecture "Introduction to Memory," and the state 318 represents an initial state of the vide lecture with respect to the user in question. Specifically, as shown, the state 318 has a value of "not watched," which may represent one of two or more potential state values that may be assigned to the state 318.

Similarly, the quiz node 310 has its state 320 assigned as "not passed." As with the state 318, the state 320 may take a value of a pair of binary state values, such as passed or not passed, or, in the case of the state 318, watched or not watched. As referenced, however, the various states, including the states 318, 320, also may be assigned a plurality or continuum of values. For example, the state 318 may be assigned three possible state values, such as not watched, partially watched, or watched. In other alternative examples, the state 318 may be assigned a percentage value representing a portion of the video lecture of the node 308 that has been watched by the user.

In the example of FIG. 3, it is assumed that a "watch" event 322 occurs with respect to the lecture of the node 308. In other words, with respect to FIG. 1, the UI generator 110 may have provided the corresponding video lecture to the user 106, within an appropriate graphical user interface (e.g., browser). Then, upon completion of the watching of the video, the event generator 112 may generate the watch event 322, and, in particular, may transmit the watch event 322 to the event handler 134.

Figure 4:
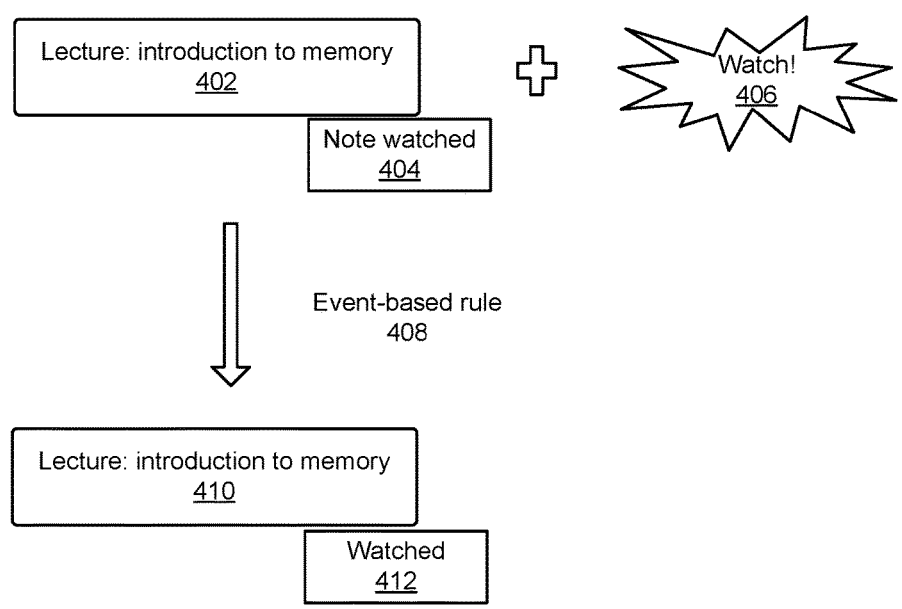
FIG. 4 is a block diagram illustrating an event-based update rule for use in the system of FIG. 1.

FIG. 4 illustrates subsequent application of event-based state update rules 140 of FIG. 1 in the context of the watch event 322 provided in the example of FIG. 3. Specifically, as illustrated in FIG. 4, the video lecture "Introduction to Memory" is illustrated as a node 402 associated with a state 404 of "not watched." In response to a watch event 406, corresponding to the watch event 322 of FIG. 3, a specific event-based rule 408, or event-based state update rule, may be applied. Consequently, as shown, the node 402 has its state 404 updated accordingly, as illustrated by the updated lecture node 410, and its associated state 412, which has a value of "watched."

Of course, the example of FIG. 4 is a highly simplified example, selected for the sake of illustration. It will be appreciated, as just referenced above, that the states 404, 412 may not be binary values, and/or may be dependent upon more than one factor for the updating thereof. In other words, for example, the event-based rule 408 may require additional data as input in order to be able to execute the corresponding event-based state update, particularly when, for example, the states may potentially assume a plurality of possible state values.

Figure 5:
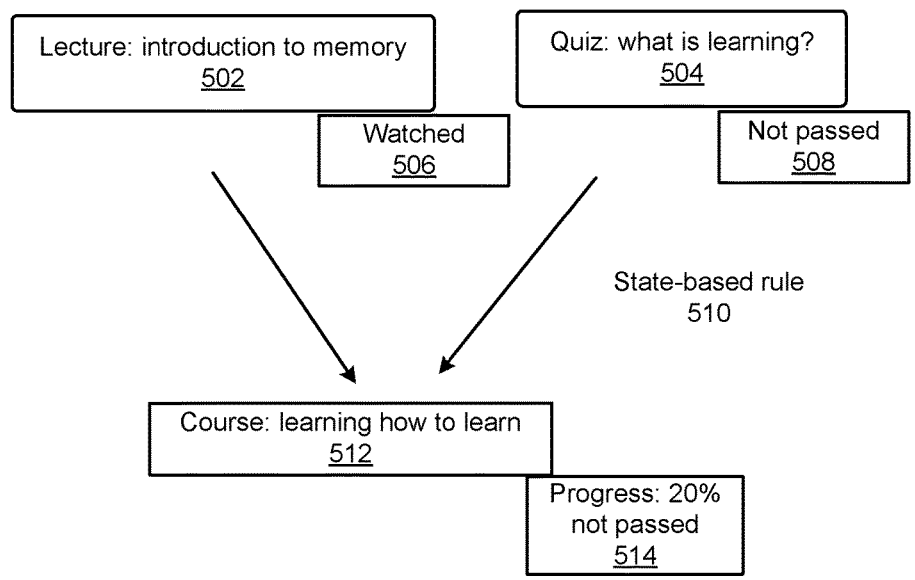
FIG. 5 is a block diagram of a state-based update rule that may be used in the system of FIG. 1.

FIG. 5 is a block diagram illustrating operations of the state-based update rules 142 in FIG. 1, with respect to the example of FIG. 3. As shown, FIG. 5 illustrates the lecture node 502 for the lecture, "Introduction to Memory," while a quiz node 504 represents a quiz on the topic, "What is Learning?" As shown, a state 506 for the lecture node 502 has been updated to, "watched," while a state 508 for the quiz node 504 is labeled as "not passed."

Then, as shown in FIG. 5, a state-based state update rule, or simply state-based rule 510, may be configured to operate on the states 506, 508. Specifically, for the course node 512 representing the "Learning How to Learn," of which the lecture of the lecture node 502 and the quiz of the quiz node 504 are a part, a state 514 represents a percentage of completion of the course, as derived from the states 506, 508, using the state-based rule 510.

As may be appreciated, the state-based rule 510 may be highly customizable, so that the state 514 is updated in the specific, desired manner. For example, a weight given to the state 506, relative to a weight given to the state 508, may be specified by the administrator 108 when constructing the state-based rule 510. Other examples of customization of the state-based rule 510 are provided herein, or would be apparent.

Figure 6:
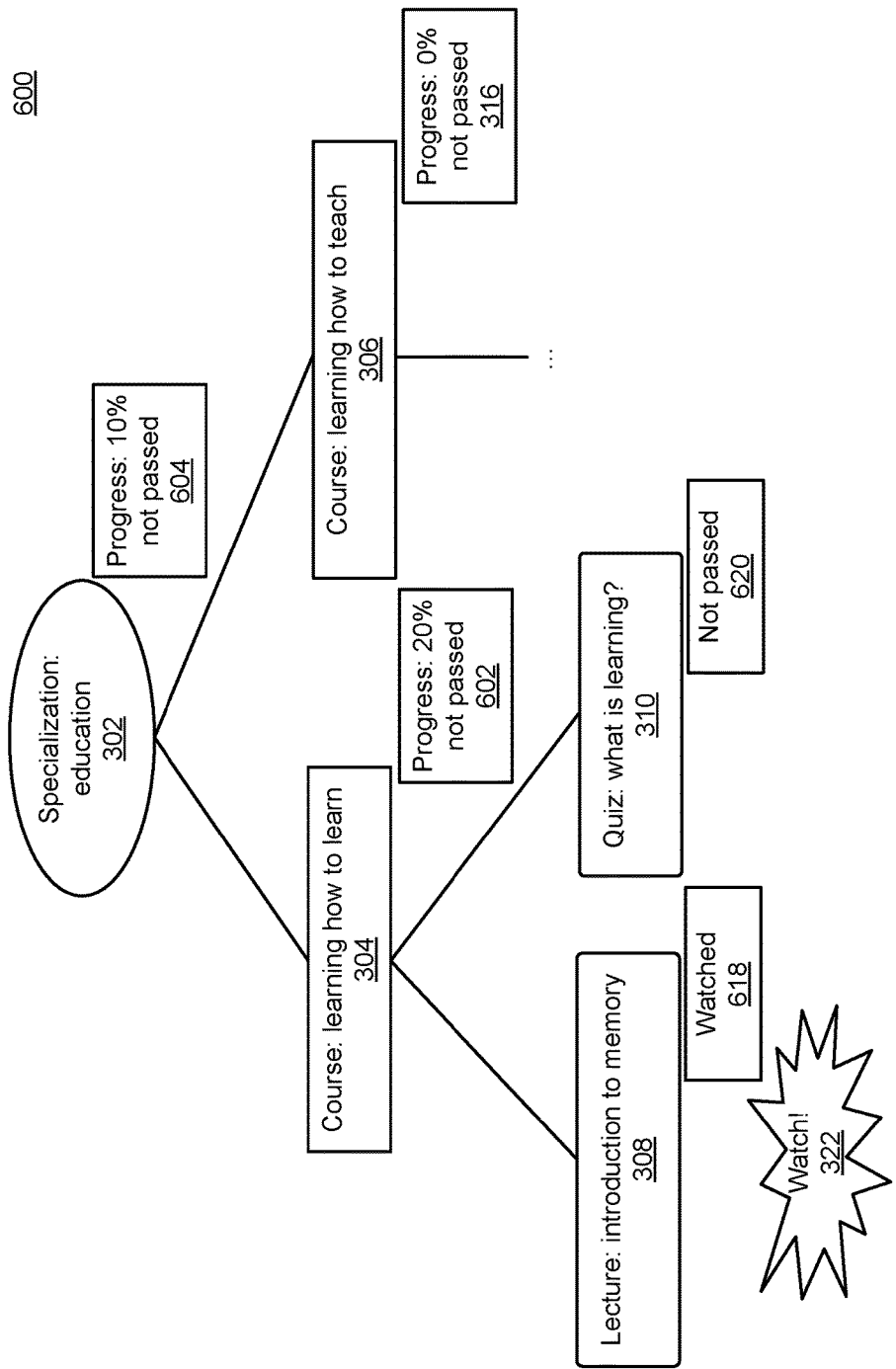
FIG. 6 is a block diagram of the content hierarchy of FIG. 3, illustrating example applications of the rules of FIGS. 4 and 5.

FIG. 6 is a block diagram of a content hierarchy 600, representing an updated version of the content hierarchy 300 of FIG. 3, and generally continuing the examples of FIGS. 3-5. Specifically, as shown, a state 602 for the course node 304 represents an update of the state 314 of FIG. 3, as already described and illustrated above with respect to the state 514 of FIG. 5.

Thus, FIG. 6 illustrates that the watch event 322 has caused the state 318 for the lecture node 308 to be updated in accordance with the event-based rule 408 of FIG. 4. Thereafter, the state 602 for the course node 304 is updated in response to the update of the state 318, in conjunction with application of the state-based rule 510 of FIG. 5.

FIG. 6 continues the example by illustrating update of a state 604 associated with the specialization node 302. In other words, just as the state 602 is updated in accordance with the state-based rule 510, in response to the state update of the state 318, the state 604 may be updated in accordance with a separate, corresponding state-based rule of the state-based update rule 142 of FIG. 1. Specifically, as shown, the state 604 is updated to reflect that the progress of the relevant user through the specialization: education of the node 302 is currently at 10%. Further, just as the state 602 includes state information indicating that the course of the course node 304 has not yet been passed, the state 604 includes an indication that completion of courses of the education specialization of the node 302 have not yet been passed.

In the example of FIG. 6, all state changes caused by an event may be considered to happen together atomically in the sense that related state changes may be included in a single message containing all of the related state changes, and individual reads will return results reflecting all or none of the state changes. Events may be structured as commutative, to avoid errors relating to the ordering of the events, and sent repeatedly and made idempotent, to avoid errors related to any failures in sending the events.

Figure 7:
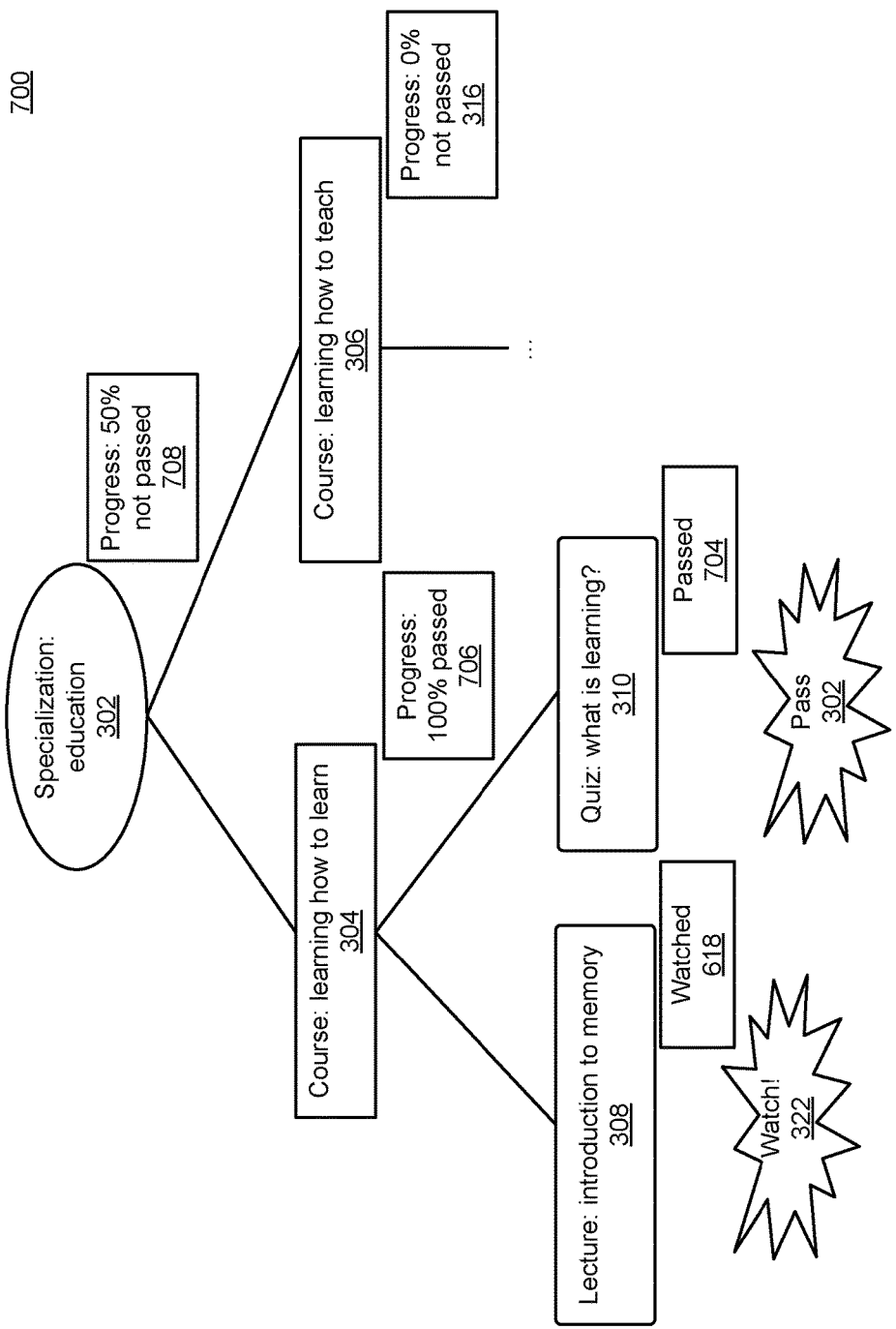
FIG. 7 is a block diagram of the content hierarchy of FIG. 6, illustrating additional example implementations of the rules of FIGS. 4 and 5.

FIG. 7 is a block diagram of a content hierarchy 700 that continues the examples of FIGS. 3-6. Specifically, as illustrated, the content hierarchy 700 represents the content hierarchy 600 of FIG. 6, after a "pass" event 702 has been received. After receipt of the pass event 702, a corresponding event-based state update rule may be invoked, similar to the event-based state update rule 408 of FIG. 4. Specifically, as shown, receipt of the pass event 702 causes update of the state 704 associated with the quiz node 310 from not passed (as shown in FIGS. 3 and 6) to passed.

Subsequently, the state-based rule 510 of FIG. 5 may again be implemented to update a state 706 of the course node 304. Specifically, as shown, the state 706 may be updated to reflect 100% completion of course work of the course associated with the course node 304, because both the lecture of the lecture node 308 and the quiz of the quiz node 310 have been completed.

Further, as already described and illustrated with respect to FIG. 6, the state update of the state 706 may itself be accounted for within a state 708 of the specialization node 302. In the simplified example of FIG. 7, it may thus be observed that the specialization: education includes two courses (i.e., represented by the course nodes 304, 306). As shown, there are two courses, and the course of the course node 304 is 100% completed and passed, while course work of the course node 306 remains associated with the state 316, which is indicating 0% progress of the user in question with respect to the course work of the course node 306. Consequently, the state 708 reflects that the specialization: education has been 50% completed, and the user in question is shown as not having passed the specialization of the node 302.

Figure 8:
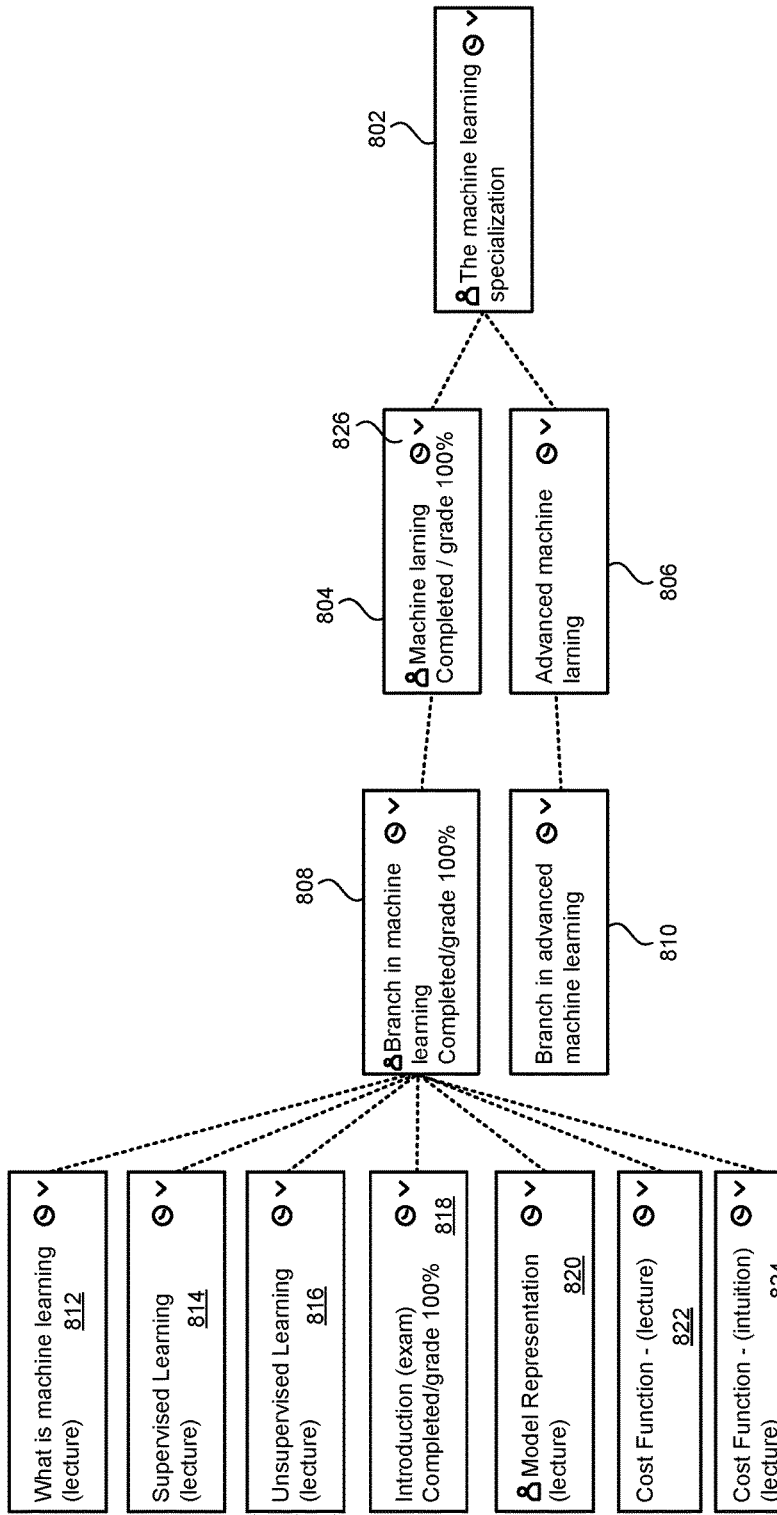
FIG. 8 is a screenshot illustrating an example user interface that may be used in the system of FIG. 1.

FIG. 8 is a screenshot 800 illustrating an example rendering of a content hierarchy, such as those illustrated above with respect to FIG. 1 and FIGS. 3-7. Specifically, as shown, a node 802 represents a machine learning specialization, which is a parent node of a node 804 for a course in machine learning, as well as a node 806 representing a course in advanced machine learning. FIG. 8 also illustrates the node 808 for "branch in machine learning," while a node 810 is a child node of the node 806 and represents a "branch in advanced machine learning." Also in FIG. 8, the node 808 representing "branch in machine learning," is also illustrated as being a parent node to a plurality of child nodes 812-824. Specifically, as illustrated, each of the nodes 812-824 generally represent a specific lecture that is included within the corresponding coursework of the node 808.

Figure 9:
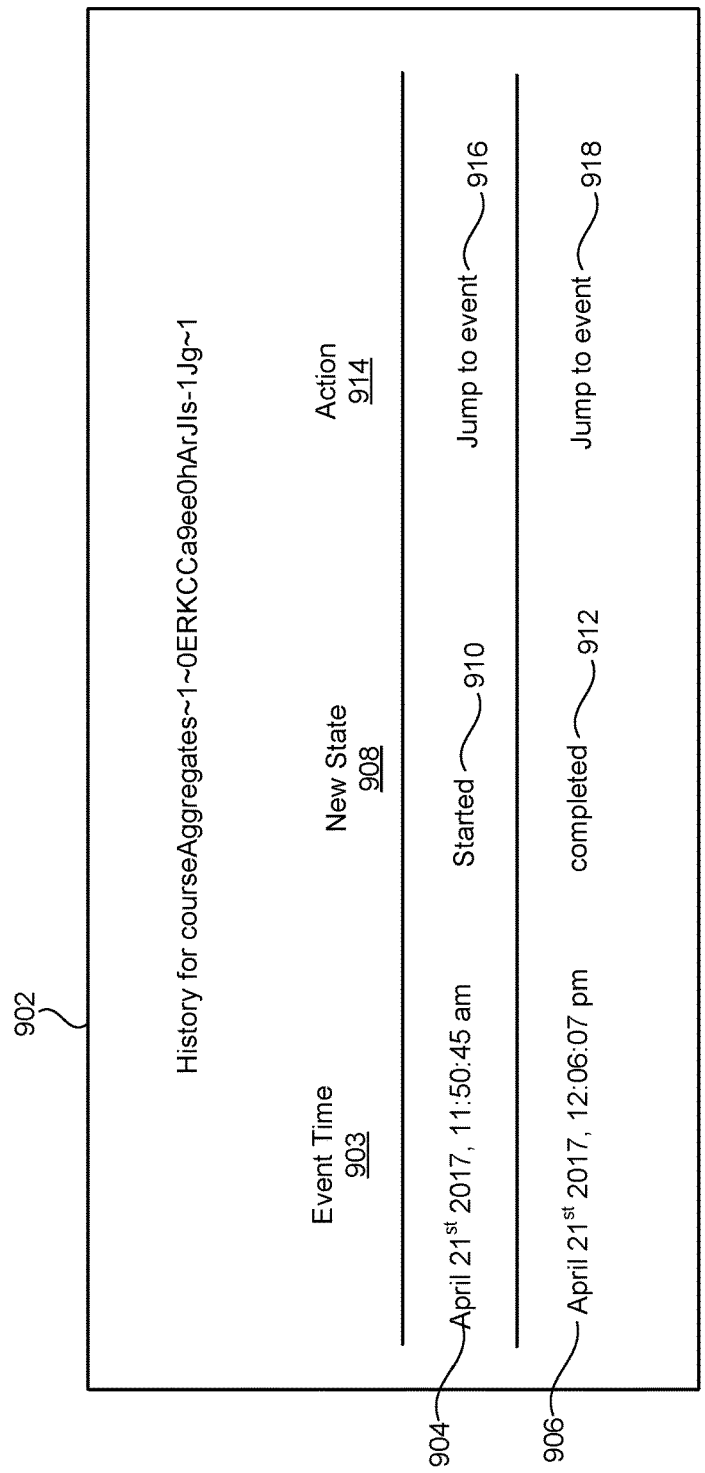
FIG. 9 is a screenshot illustrating state information that may be observed through the use of the user interface of FIG. 8.

As shown, each of the various nodes 802-824 may include a specific icon, such as a clock icon 826 associated with the node 804. In practice, the icon 826 may be utilized or selected, where upon a user clicks on the icon 826 may be provided with a history of a state associated with the coursework of the node 804. Thus, FIG. 9 is a screenshot illustrating a result of a selection of the node icon 826, or a similar icon. As illustrated, selecting the icon 826 results in a rendering of a state history window 902.

As shown, for the event in question, the screenshot 902 includes an event time 903. As also shown, a time 904 of the event time 903 corresponds to a timestamp associated with a detected event of the coursework of the screenshot 800 of FIG. 8. Similarly, a time 906 within the column of the event time 903 corresponds to a state-related event.

As shown, a "new state" column 908 includes and illustrates a state update history for the icon 826 and its associated node 804. As shown, the new state data 908 includes a "started" state 910, recorded in response to an event of the event time 904. Similarly, a current state of the content hierarchy node in question is marked as "completed" 912, as of the time of the second event time 906.

Finally in the example of FIG. 9, an action 914 illustrates a column in which a link 916 and a link 918 are respectively provided with respect to corresponding event times 904, 906 and states 910, 912. For example, by providing the link 916, a user may quickly and easily select and view further details regarding the event in question.

Thus, FIGS. 1-9 illustrate the use of the state update rules 138 to specify how user interactions of pieces of content will change the state of individual users with respect to that piece of content, as well as state-based state update rules 142, which specify how user states on certain pieces of content are affected by user states on other pieces of content.

Pseudocode 1 illustrates simplified, example pseudo code is similar to the types of code that may be used to specify event-based rules:

Pseudocode 1

```
# Rules for an assignment state (an event-based-state rule).
def next_state(previous_state, event):
    return {
        grade: max(previous_state.grade, event.grade)
    }
```

As shown in pseudocode 1, a next_state is defined with respect to a combination of a previous_state and an event. Further in pseudocode 1, it is assumed that pseudocode 1 relates to an example event-based rule for updating state information for an assignment, in which submission of assignment answers results in an assignment grade that may be included within the state for that assignment, as well as an indication that the assignment has been passed, if appropriate. In the simplified example of pseudocode 1, the next_state for the assignment is returned as a maximum value of a preceding state grade and the event grade associated with the event.

Similarly, pseudocode 2 represents code that may be constructed to implement the state-based state update rules 142, also referred to as a derived-state rule in the example of pseudocode 2:

Pseudocode 2

```
# Rules for a course state (a derived-state rule).
def state_depends_on(course):
    return course.assignment_ids
def state(course, assignment_states):
    return {
        "grade": weighted_average(
            course.assignment_weights, assignment_states)
    }
```

As shown, pseudocode 2 provides an example in which the state of a course depends on states of one or more underlying assignments. In particular, a state of a course may be defined as a grade, which may be computed as a weighted average of individual assignment states (grades).

Figure 10:
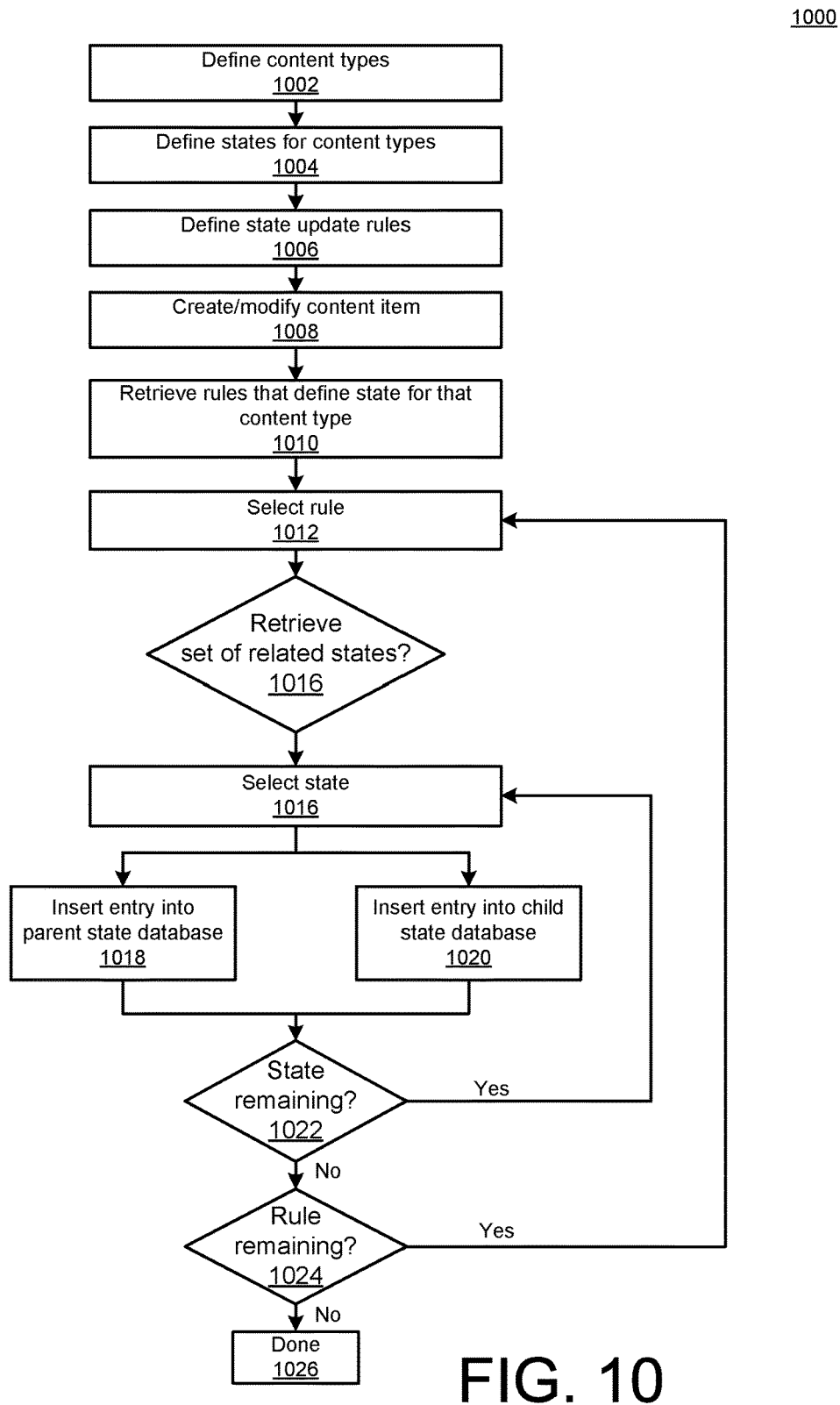
FIG. 10 is a flowchart illustrating database configuration techniques for enabling fast and efficient storage and retrieval of state dependency data for course content.

FIG. 10 is a flowchart 1000 illustrating example techniques for populating the state database 137 of FIG. 1 in conjunction with the state update rules 138. In practice, the administrator 108 may define the various types of content that will be associated with state updates (1002). For example, different types of content may include lectures, quizzes, assignments, textual readings, or other coursework that be authored using the authoring tool 111.

States, or types of states, may be defined for each of the various content types (1004). For example, for a content type of "video lecture," as already described, a state of watched, partially watched, or not watched may be defined.

State update rules may also be defined (1006). For example, the state update rules of pseudo code 1 and pseudo code 2 may be defined.

Then, when an author creates or modifies a specific content item (1008), such as a piece of content X with $id_x$, then all the rules defining state for the content type of the authored content item may be retrieved (1010). In other words, all the rules defining the state associated with the type of content being authored may be retrieved. A rule of the retrieve rules is selected (1012), and, for the selected rule, the set of IDs of the states of its rule depends on may be retrieved (1014). For example, with respect to pseudo-code 2, the method state_depends_on may be used.

Then, for each selected state with identifier $id_s$, an entry ($id_s$->$id_{R,X}$) is inserted into the state database 137, indicating that state $id_s$ affects state $id_{R,X}$ (where $id_{R,X}$ is the id of the state specified by rule R for content X). In more detail, as shown in FIG. 10, an entry is made into a parent state database (1018) and into a child state database (1020).

For example, each entry may be inserted into two Cassandra tables. In the following examples, Cassandra tables refer to a known database management system for a high-availability, distributed database management system. However, other suitable types of databases and database management systems may be used, as well.

One of the tables enables a rapid, single Cassandra read to determine all the states that a given state depends on, and the other table enables rapid look up of all the states that depend on a given state. The Cassandra tables may be created using a variation of pseudocode 3:

Pseudocode 3

```
create table sources_by_results (
result_key varchar,
source_key varchar,
PRIMARY KEY (child_key, parent_key)
);
create table results_by_sources (
source_key varchar,
result_key varchar,
PRIMARY KEY (parent_key, child_key)
);
```

As long as states remain (1022), corresponding entries may be inserted (1018, 1020). Once all states for a rule are considered, then if any rules are remaining (1024), the remaining rules (and their associated states) may be processed (1014-1022). The process completes when all rules have been considered and processed (1026).

Thus, once operations of the flowchart 1000 of FIG. 10 have been completed, new content has been included and stored within the content hierarchy in which all content items are associated with corresponding states. Further, the state database 137 has been updated so that the parent state table includes, for each state, all states directly depended on by that state, while the child state table stores all states that directly depend on that state.

Figure 11:
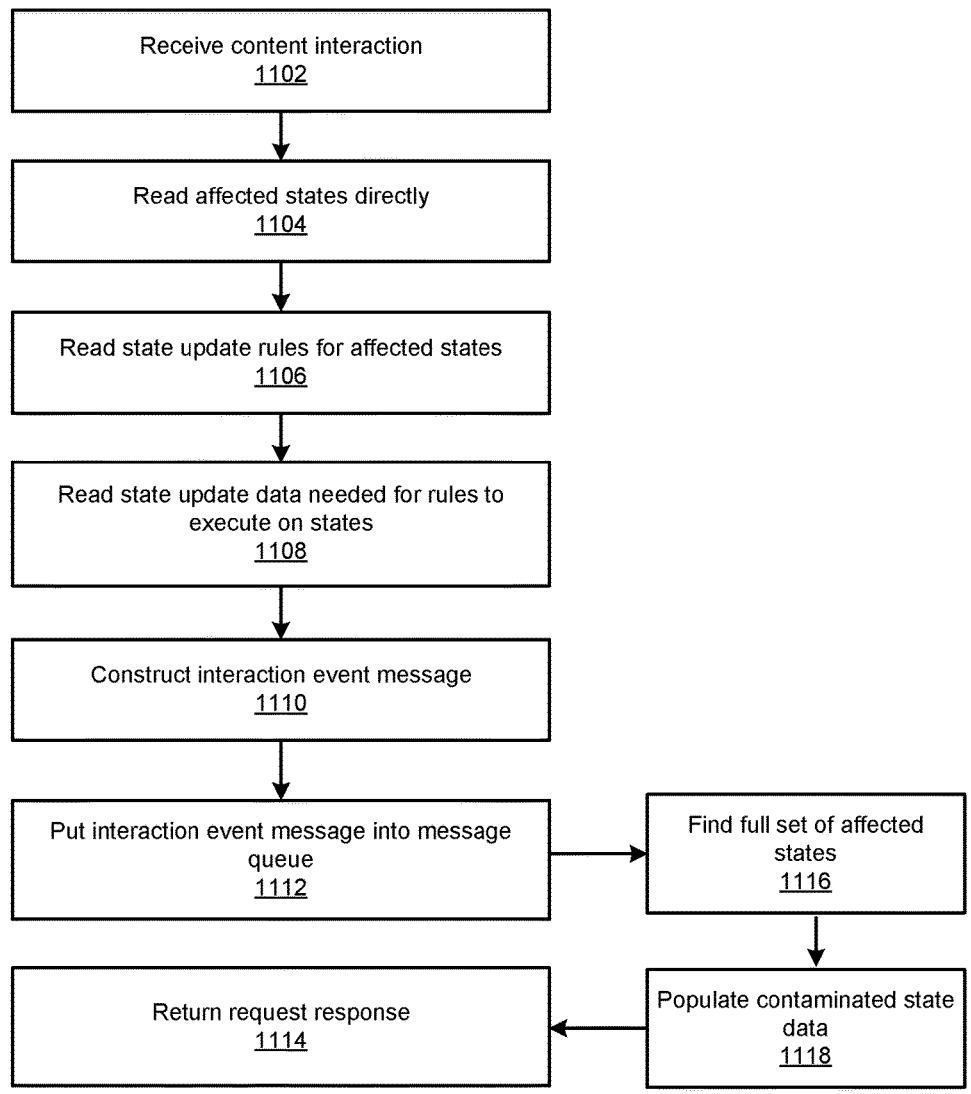
FIG. 11 is a flowchart illustrating techniques for responding to a user interaction, including gathering state-related information needed to perform dynamic state updates.

FIG. 11 is a flowchart 1100 illustrating operations associated with subsequent interactions of the user 106 or the administrator 108 with the content hierarchy and associated state information that result from the operations of the flowchart 1000 of FIG. 10. In other words, once the content hierarchy has been created, and the state database 137 has been updated accordingly with associated state dependency entries, it may occur that a normal content interaction is received (1102). That is, for example, such content interaction may include any progress made by the user 106 in completing coursework of one or more courses of the content hierarchy created through the operations of FIG. 10, such as, e.g., watching a lecture, taking a quiz, or submitting an assignment.

For example, as described with respect to FIG. 1, the event handler 134 may receive one or more events associated with the content interaction from the event generator 112. For example, the event handler 134 may be structured as a kafka message queue, partitioned by individual users such as the user 106, which allows multiple event producers to publish messages to the message queue, and from multiple consumer handlers to consume messages from the queue and take action based thereon. As may be appreciated, partitioning by user ensures that no two consumers ever simultaneously process the message for the same user.

In operation, the event handler 134 may proceed to read directly affected states from the state database 137 (1104). Then, the event handler 134 may read the state update rules for the directly-affected states (1106). For example, the event handler 134 may access relative state update rules of the state update rules 138.

The event handler 134 may proceed to read relevant state update data that may be needed to execute the relevant rules on the relevant states (1108). For example, as described above with respect to FIGS. 4 and 5, the various state update rules represent developer-defined functions that are highly customizable by content developers. For example, for a submission of an assignment representing the content interaction, the state update rule for the state of the assignment may require a submission score for the assignment that may be stored in a separate database in order to proceed with accurately updating the assignment state.

Using the data from preceding operations, the event handler 134 may construct an interaction event message to be stored within its associated kafka queue (1110). The event handler 134 may then proceed to store the interaction event message within the message queue accordingly (1112).

In some implementations of the flowchart 1100 of FIG. 11, it may be possible to simply return a request response (1114) to the original content interaction, in conjunction with putting the interaction event message into the message queue, and independently of a completion of executing relevant state updates (as described in detail below with respect to FIG. 12). In other words, continuing the example of the user 106 submitting an assignment as the example of the original content interaction, a suitable request response may include a submission score for the received assignment, which may be returned as part of the normal operations of the content platform 104. However, such a response does not require (e.g., is independent of) the corresponding state update (e.g., updating the state of the assignment from not submitted to submitted), as well as any associated state updates.

In practice, however, as described above with respect to the contaminated state handler 144 and the contaminated state data 146, it may occur that a relevant state query 130 is received prior to completion of the state update operations described below with respect to FIG. 12. In other words, for example, in the example of the assignment submission, it may occur that the corresponding interaction event message remains within the message queue of the event handler 134 at a time that the state query 130 is received. In such scenarios, the query response 112 may not be completed accurately in responding to the state query 130.

To avoid associated errors, concurrently with publishing a message to the kafka message queue, the contaminated state handler 144 may proceed to identify a full set of affected state IDs (1116) e.g., by recursively reading the edges of the state dependency stored in the state database 137 during the operations of FIG. 10.

The contaminated state handler 144 may then proceed to populate the contaminated state data 146 (1118). Specifically, for each affected state $id_s$, the contaminated state handler 144 may proceed to write an entry in the contaminated state data 146 with a partition key (user_id, idS), indicating that the state $id_s$ for user_id is contaminated. The associated contaminated marker contains at least the following data: the same IDs and data included within the interaction event message stored in the kafka message queue, as well as the set of all affected state IDs determined in operation 1116.

In these implementations of FIG. 11, the request response of operation 1114 may be held until all contaminated markers have been populated within the contaminated state data 146. In this way, the user 106 will not be able to receive the request response and then submit the state query 130 prior to a time that the associated states are fully and accurately updated.

Figure 12:
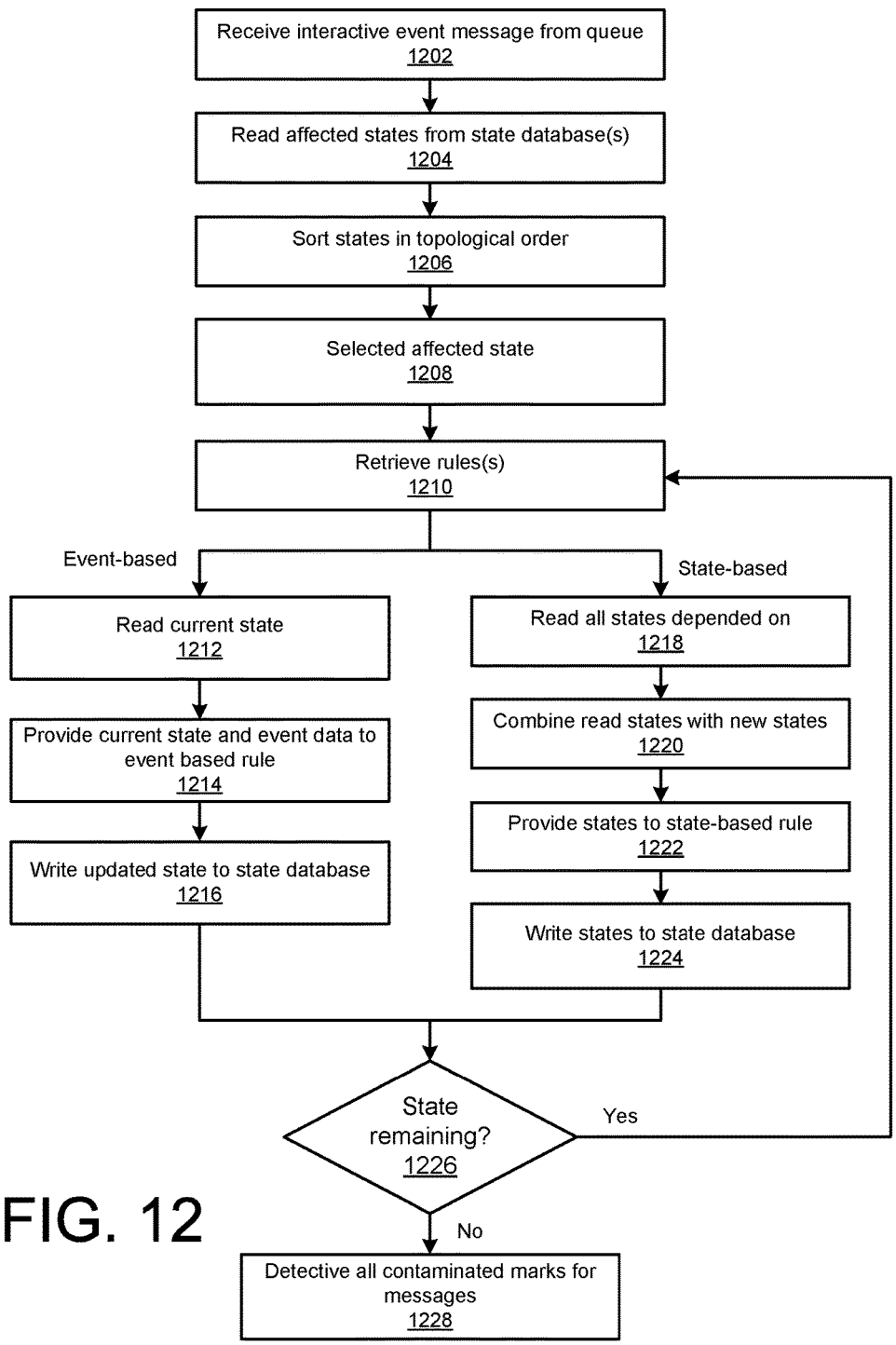
FIG. 12 is a flowchart illustrating example techniques for executing dynamic state updates, using the outputs of the flowchart of FIG. 12.

FIG. 12 is a flowchart 1200 illustrating techniques for executing all state updates, including the use of the contaminated state data 146. In the example of FIG. 12, the interactive event message is received from the corresponding message queue, described above with respect to FIG. 11 (1202). The remaining operations of the flowchart 1200 of FIG. 12 are designed to calculate all the states that should be changed by the interactive event message, and to store the updated states within the state database 137.

To proceed with executing this goal, the state handler 136 reads all affected states from the state database 137 (1204). For example, the state handler 136 may proceed to recursively read the dependency edges between each affected state in its parent state or states (using the parent state database), and subsequently reading each affected child state from the child state database.

The state handler 136 may proceed to sort the retrieved set of states in topological order (1206). Specifically, the state handler 136 may sort the affected states with each state ID provided after the ID or IDs of all the states on which it depends.

The state handler 136 may then proceed to recursively select and update each affected state. The state handler 136 may proceed by selecting a first affected state from the topologically ordered and sorted states (1208). The state handler 136 may retrieve one or more associated state update rules from the state update rules 138 (1210).

If the retrieved rule for the current, selected state is in an event-based state update rule, then the state handler 136 may proceed to read the current state (1212). As described above, the current state may be stored in a single row within a Cassandra table with a partition key (user_id, $id_s$), so that the operation is a single Casandra read.

The state handler 136 may then call the rule's next_state function, and pass the current state and the event data to the next_state function for the corresponding event-based rule (1214). The state handler 136 may then write the resulting, updated state to the state database 137 (1215). Specifically, the write operation may be conducted as a single write operation to a corresponding Cassandra table with partition key (user_id, $id_s$).

If the retrieved rule for the affected state is a state-based update rule, then the state handler 136 may proceed to read all the states that the selected state depends on (1218). For example, as referenced above, all of these states may be stored in a single row within a Cassandra table with partition key (user_id, $id_s$)), which again would be a single Cassandra read operation.

The state handler 136 may then proceed to combine the states received from the just-described read operation with new states that may have been obtained from state updates already executed in earlier iterations, would be new states taking precedence (1220). Then, the state handler 136 may call the relevant state-based rule and provide the state-based rule with the combined states (1222).

The state handler 136 may then write the result of the operation of the state-based rule, i.e., the calculated updated state, and all the states it depends on to the state database 137 (1224). For example, the write operation may be executed as a single write to a Cassandra table with partition key (user_id, $id_s$).

If the selected, affected state had only one state update rule, or if a final update rule has been iteratively selected and processed, then iterations may proceed to any subsequent, remaining state that may be selected (1226, 1208). When all affected states have been selected, and all relevant rules have been processed, then the state database 137 is fully updated. At this point, the contaminated state handler 144 may be notified, and may proceed to delete all contaminated markers for the associated interaction event message from the contaminate state data 146 (1228). In other words, since this state data of the state database 137 is current and complete at this point, associated contaminated markers are no longer necessary to respond to any relevant state queries that may be received at this time.

Figure 13:
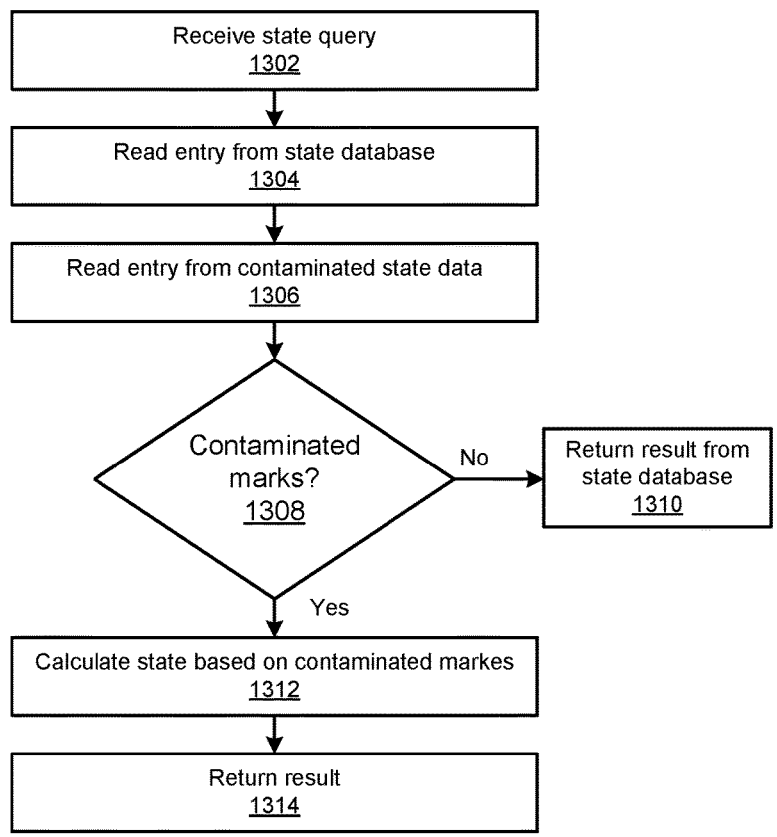
FIG. 13 is a flowchart illustrating example techniques for receiving and serving a query requesting current state data.

FIG. 13 is a flowchart 1300 illustrating example operations for receiving and responding to the state query 130. When the state query 130 is received (1302), the query handler 128 may proceed to read the corresponding entry from the state database 137 (1304). In other words, when a particular user or administrator wants to know a state for a particular user user_id, a piece of content X, and associated rule R, the query handler 138 may simply read the current entry at (user_id, $id_{R, X}$) from the relevant Cassandra table, for use in responding to the state query.

The query handler 128 may also read all the entries for the user at (user_id, $id_{R, X}$) from the Cassandra table of the contaminated state data 146 (1306). If no contaminated markers are found within the contaminated state data 146 (1308), then the query handler 128 may simply return the query response 132 (1310).

If contaminated markers are present (1308), then the query handler 128 may request that the contaminated state handler 144 calculate the current state for the requested state ID, using the contaminated markers (1312). In other words, the contaminated state handler 144 recursively calculates with the state at $\mathrm{id}_{R,\ X}$ would be, if all the events described the contaminated markers of the contaminated state data 146 were applied. Then, that result may be returned as the query result 132 (1314).

Figure 14:
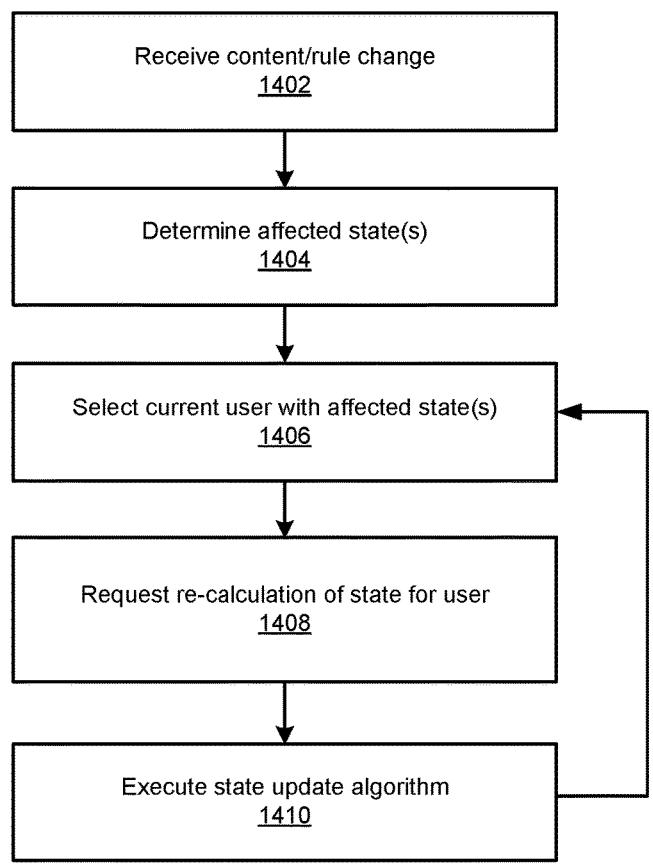
FIG. 14 is a flowchart illustrating example techniques for updating state information in response to content or other changes.

With respect to FIG. 14, it will be appreciated from the above description that the state database 137 stores current, updated state data that is dynamically updated as content interactions are received from the user 106, representing a large plurality of users. Such updates of the state database 137 are made regardless of whether a given state query is received with respect to any particular piece of state data. In other words, the state data is cumulatively and collectively calculated and stored in an easily-queryable condition.

However, in some instances, as referenced above, changes may be made to content of the content hierarchy 114, or rules of the state update rules 138. Such changes may be made for a variety of reasons that may not be specifically associated with operations of the state management service 102. For example, a content author may simply wish to update a structure or content of a course, or an administrator may wish to redefine which courses are associated with a particular specialization. Nonetheless, if such changes are made after a period of time in which large quantities of state data have been updated and stored within the state database 137, it may occur that significant percentages of state data within the state database 137 may become stale or outdated.

Consequently, FIG. 14 is a flowchart 1400 illustrating example operations for updating state data within the state database 137 in response to content or rule changes. Accordingly, when a content or rule change is received (1402), then the state handler 136 may proceed to determine affected states (1404). The state handler may proceed to select current users who currently have one of the affected states (1406).

Then, for each user, the query handler 128 may publish an interaction event message to the queue of the event handler 134, requesting a recalculation of the affected state (e.g., the state at $\mathrm{id}_{R,\ X}$) for that user (1408). At this point, the state handler 136 will simply read the queued message, as part of the normal course of operations of reading messages from the queue and updating the state database 137, as described above with respect to FIG. 12 (1410). As also illustrated in FIG. 14, this process may continue iteratively for each selected user.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:

receive a content item of a content hierarchy of content items, the received content item associated with a content type of coursework of an online learning content platform, wherein each of the content items is associated with a state per user characterizing a current effect of interactions of the user with the coursework, including a corresponding state for the received content item;

access, from a state update rules database, a state update rule governing state updates for the content type;

determine, from the state update rule, a child state upon which the corresponding state depends;

insert, into a state database, a state relationship entry characterizing the relationship between the child state and the corresponding state, wherein the state database thereby includes a state relationship hierarchy corresponding to the content hierarchy and defined by state relationship entries characterizing dependencies between the states, including the state relationship entry;

receive an interaction event message characterizing a content interaction of the user with a selected content item of the content items;

calculate, based on the state relationship hierarchy and the interaction event message, all affected states of the content interaction;

update the affected states using corresponding state update rules of the state update rules database; and store the updated states in the state database.

2. The computer program product of claim 1, wherein the instructions, when executed, are further configured to:
insert the state relationship entry including inserting two state relationship entries, including a parent state relationship entry identifying all parent states of the corresponding state, and a child relationship entry identifying all child states of the corresponding state.

3. The computer program product of claim 1, wherein the instructions, when executed, are further configured to:
receive the interaction event message, the interaction event message characterizing the content interaction and identifying directly-affected states, and identifying event data required for the state update rule to execute.

4. The computer program product of claim 1, wherein the instructions, when executed, are further configured to:
publish the interaction event message to a message queue containing a plurality of interaction event messages for a plurality of content interactions, the message queue partitioned by user; and
consume the plurality of interaction event messages from the message queue and execute corresponding state updates of the state database.

5. The computer program product of claim 1, wherein the instructions, when executed, are further configured to:
read the interaction event message and recursively read all directly and indirectly affected states including reading edges of the state relationship hierarchy.

6. The computer program product of claim 1, wherein the instructions, when executed, are further configured to:
determine that an affected state of the affected states is associated with an event-based state update rule;
pass the affected state and event data included with the interaction event message to the event-based state update rule; and
write the results of execution of the event-based state update rule to the state database.

7. The computer program product of claim 1, wherein the instructions, when executed, are further configured to:
determine that an affected state of the affected states is associated with a state-based state update rule;
pass the affected state and state data of all parent states of the affected state within the state relationship hierarchy to the state-based state update rule; and
write the results of execution of the state-based state update rule to the state database.

8. The computer program product of claim 1, wherein the instructions, when executed, are further configured to:
receive a state query requesting a current state of the user with respect to the content item;
read the requested state from the state database, for the user; and
return a state query response, including the requested state.

9. The computer program product of claim 1, wherein the instructions, when executed, are further configured to:
receive a change to the content item or to the state update rule;
determine at least one state affected by the change;
identify all users of the online learning content platform at the at least one state; and
update the state database for the identified users, including re-calculating the at least one state.

10. A method comprising:
receiving a content item of a content hierarchy of content items, the received content item associated with a content type of coursework of an online learning content platform, wherein each of the content items is associated with a state per user characterizing a current effect of interactions of the user with the coursework, including a corresponding state for the received content item;
accessing, from a state update rules database, a state update rule governing state updates for the content type;
determining, from the state update rule, a child state upon which the corresponding state depends;
inserting, into a state database, a state relationship entry characterizing the relationship between the child state and the corresponding state, wherein the state database thereby includes a state relationship hierarchy corresponding to the content hierarchy and defined by state relationship entries characterizing dependencies between the states, including the state relationship entry;
receiving an interaction event message characterizing a content interaction of the user with a selected content item of the content items;
calculating, based on the state relationship hierarchy and the interaction event message, all affected states of the content interaction;
updating the affected states using corresponding state update rules of the state update rules database; and
storing the updated states in the state database.

11. The method of claim 10, further comprising:
inserting the state relationship entry including inserting two state relationship entries, including a parent state relationship entry identifying all parent states of the corresponding state, and a child relationship entry identifying all child states of the corresponding state.

12. The method of claim 10, further comprising:
receiving the interaction event message, the interaction event message characterizing the content interaction and identifying directly-affected states, and identifying event data required for the state update rule to execute.

13. The method of claim 10, further comprising:
publishing the interaction event message to a message queue containing a plurality of interaction event messages for a plurality of content interactions, the message queue partitioned by user; and consuming the plurality of interaction event messages from the message queue and execute corresponding state updates of the state database.

14. The method of claim 10, further comprising:

reading the interaction event message and recursively read all directly and indirectly affected states including reading edges of the state relationship hierarchy.

15. The method of claim 10, further comprising:

determining that an affected state of the affected states is associated with an event-based state update rule;

passing the affected state and event data included with the interaction event message to the event-based state update rule; and writing the results of execution of the event-based state update rule to the state database.

16. The method of claim 10, further comprising:

determining that an affected state of the affected states is associated with a state-based state update rule;

passing the affected state and state data of all parent states of the affected state within the state relationship hierarchy to the state-based state update rule; and writing the results of execution of the state-based state update rule to the state database.

17. The method of claim 10, further comprising:

receiving a state query requesting a current state of the user with respect to the content item;

reading the requested state from the state database, for the user; and returning a state query response, including the requested state.

18. The method of claim 10, further comprising:

receiving a change to the content item or to the state update rule;

determining at least one state affected by the change;

identifying all users of the online learning content platform at the at least one state; and updating the state database for the identified users, including re-calculating the at least one state.

19. A computer program product, the computer program product being tangibly embodied on a non-transitory computer-readable storage medium and comprising instructions that, when executed, are configured to cause at least one computing device to:

determine a content hierarchy of content items associated with coursework of an online learning content platform, each content item being associated with a state per user characterizing a current effect of interactions of the user with the coursework;

determine, from a state database, a state relationship hierarchy defined by state update rules for each state of each content item;

store a queue of interaction event messages characterizing content interactions of a plurality of users, including the user, with the coursework, wherein the queue is partitioned by user; and execute a state update algorithm operating on messages from the queue to update all states of the state relationship hierarchy that are changed by each queued message, and to store the updated states within the state database, the state update algorithm including traversing, for a current interaction event message, the state relationship hierarchy to find all states directly and indirectly affected by the interaction event message, executing a state update for each state associated with an event-based state update rule, using event data associated with the interaction event message, and executing a state update for each state associated with a state-based state update rule, based on any already-executed state updates for one or more underlying states within the state relationship hierarchy.

20. The computer program product of claim 19, wherein the instructions, when executed, are further configured to:

store, while each interaction event message is in the message queue, contaminated state data identifying pending state updates, wherein the contaminated state data is used to execute a corresponding state update when a state query is received for a queued interaction event message, and deleted when the queued interaction event message is successfully consumed from the message queue.

* * * * *